United States Patent
Shiroshima et al.

(10) Patent No.: US 9,967,323 B2
(45) Date of Patent: May 8, 2018

(54) MESSAGE DISTRIBUTION SYSTEM, DISTRIBUTION SEQUENCE DETERMINATION DEVICE, DISTRIBUTION SEQUENCE DETERMINATION METHOD, AND DISTRIBUTION SEQUENCE DETERMINATION PROGRAM

(71) Applicant: NEC Corporation, Minato-ku, Tokyo (JP)

(72) Inventors: Takahiro Shiroshima, Tokyo (JP); Takeo Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 14/758,429

(22) PCT Filed: Oct. 11, 2013

(86) PCT No.: PCT/JP2013/077773
§ 371 (c)(1),
(2) Date: Jun. 29, 2015

(87) PCT Pub. No.: WO2014/109102
PCT Pub. Date: Jul. 17, 2014

(65) Prior Publication Data
US 2015/0334175 A1    Nov. 19, 2015

(30) Foreign Application Priority Data

Jan. 11, 2013 (JP) .................................. 2013-003687

(51) Int. Cl.
*H04L 29/08* (2006.01)
*H04L 12/911* (2013.01)
*H04L 12/851* (2013.01)

(52) U.S. Cl.
CPC .............. *H04L 67/10* (2013.01); *H04L 47/24* (2013.01); *H04L 47/74* (2013.01); *H04L 47/822* (2013.01); *H04W 76/27* (2018.02); *H04W 76/28* (2018.02)

(58) Field of Classification Search
CPC ....... H04L 12/581; H04L 49/90; H04L 47/14; H04L 47/805; H04L 47/824;
(Continued)

(56) References Cited

U.S. PATENT DOCUMENTS 6,535,855 B1 *   3/2003  Cahill .................. G06Q 30/0281
                                                   340/540
6,990,534 B2 *   1/2006  Mikhailov ........ G06F 17/30861
                                                   707/E17.107
(Continued)

FOREIGN PATENT DOCUMENTS

JP        2010-523046 A        7/2010
JP        2010206807 A         9/2010
(Continued)

OTHER PUBLICATIONS

3rd Generation Partnership Project; Technical Specification Group Radio Access Network; "Radio Resource Control (RRC);Protocol specification(Release 9)", 3GPP TS 25.331 V9.12.0 (Sep. 2012) Cited in Specification.

(Continued)

*Primary Examiner* — Sargon Nano

(57) ABSTRACT

In order to reduce wasteful delays occurring when a mobile terminal whose RRC state is a state wherein communication is possible transfers in a temporarily stopped state, a distribution sequence determination device, which determines the distribution sequence for push messages transmitted to each of multiple terminals, determines the distribution sequence on the basis of whether each of the multiple terminals is in a state wherein communication is possible or is in a tem- (Continued)

porarily stopped state, so as to transmit the push messages to each of the multiple terminals in a distribution sequence in which terminals in a state wherein communication is possible are given priority over terminals in the temporarily stopped state.

9 Claims, 6 Drawing Sheets

(58) Field of Classification Search
CPC ......... H04L 2012/6464; H04L 65/4076; H04L 65/4084; H04L 65/80; H04L 67/10; H04L 29/08; H04M 2203/205; H04W 40/20; G06F 13/18; G06F 2209/508
See application file for complete search history.

(56) References Cited

U.S. PATENT DOCUMENTS

| | | | | |
|---|---|---|---|---|
| 8,706,798 | B1* | 4/2014 | Suchter | G06F 9/5038 709/202 |
| 9,479,387 | B2* | 10/2016 | Arabo | H04L 29/08693 |
| 2004/0039505 | A1* | 2/2004 | Vollmer | H04L 12/40019 701/36 |
| 2004/0085981 | A1* | 5/2004 | Lee | H04L 47/10 370/412 |
| 2005/0002354 | A1* | 1/2005 | Kelly | H04L 45/04 370/329 |
| 2005/0149620 | A1* | 7/2005 | Kirkland | G06Q 10/10 709/207 |
| 2006/0046757 | A1* | 3/2006 | Hoover | H04M 3/533 455/518 |
| 2007/0263818 | A1* | 11/2007 | Sumioka | H04L 29/06027 379/201.01 |
| 2012/0117250 | A1* | 5/2012 | Santamaria | H04L 61/256 709/227 |
| 2013/0047034 | A1* | 2/2013 | Salomon | H04W 4/00 714/18 |
| 2013/0276049 | A1 | 10/2013 | Yamagishi | |
| 2013/0298031 | A1* | 11/2013 | Kanda | H04L 41/22 715/733 |
| 2013/0346521 | A1* | 12/2013 | Arabo | H04L 29/08693 709/206 |

FOREIGN PATENT DOCUMENTS

| | | |
|---|---|---|
| JP | 2011100490 A | 5/2011 |
| JP | 2012-150572 A | 8/2012 |
| JP | 2012230555 A | 11/2012 |
| WO | 2013001987 A1 | 1/2013 |
| WO | 2014/007990 A1 | 1/2014 |

OTHER PUBLICATIONS

3rd Generation Partnership Project;Technical Specification Group Radio Access Network; "Evolved Universal Terrestrial Radio Access (E-UTRA); Radio Resource Control (RRC); Protocol Specification (Release 11)", 3GPP TS 36.331 V11.1.0 (Sep. 2012) Cited in Specification.

International Search Report for PCT Application No. PCT/JP2013/077773, dated Nov. 12, 2013.

English Translation of written opinion for PCT Application No. PCT/JP2013/077773.

Japanese Office Action for JP Application No. 2014-556323 dated Nov. 21, 2017 with English Translation.

Decision to Grant Patent in counterpart JP patent application 2014-556323, dated Feb. 27, 2018.

* cited by examiner

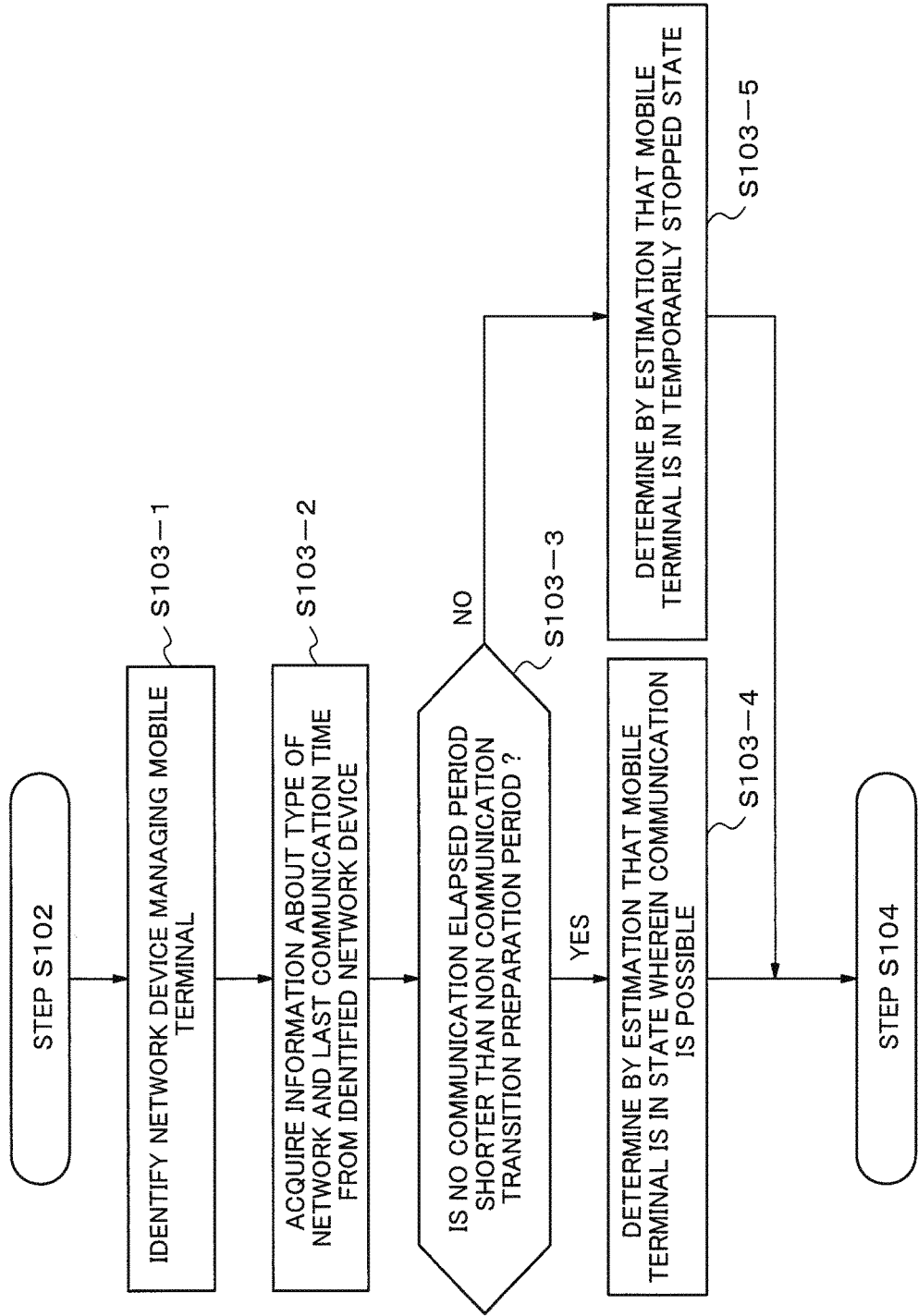

MESSAGE DISTRIBUTION SYSTEM, DISTRIBUTION SEQUENCE DETERMINATION DEVICE, DISTRIBUTION SEQUENCE DETERMINATION METHOD, AND DISTRIBUTION SEQUENCE DETERMINATION PROGRAM

This application is a National Stage Entry of PCT/JP2013/077773 filed on Oct. 11, 2013, which claims priority from Japanese Patent Application 2013-003687 filed on Jan. 11, 2013, the contents of all of which are incorporated herein by reference, in their entirety.

TECHNICAL FIELD

The present invention relates to a message distribution system for distributing a message, a distribution sequence determination device, a distribution sequence determination method, and a distribution sequence determination program.

BACKGROUND ART

In recent years, a demand for wireless communication using internet or the like even during moving is increasing. With increase of this demand, a demand for high speed wireless communication is also increasing. In such a situation, a portable telephone and a mobile terminal such as a smart phone, a tablet type personal computer, or the like which can perform high-speed packet communication are increasing.

As standards for realizing such high-speed packet communication, the various standards are proposed. As the specific examples, the standards for W-CDMA (Wideband Code Division Multiple Access), HSPA (High Speed Packet Access), LTE (Long Term Evolution), and the like are proposed. Each mobile terminal based on these standards can realize high-speed packet communication.

However, when the high-speed packet communication is performed, the power consumption of the terminal increases. Therefore, a problem occurs, in which the electric power stored in the battery is consumed at a high rate when a battery-driven mobile terminal performs the high-speed packet communication and time when the terminal can be used by a user at the time of going out decreases.

As a technology related to this problem, there is a technology to reduce the power consumption by performing a control such as setting an RRC (Radio Resource Control) state according to the communication state of the mobile terminal.

An example of the control method relating to RRC is disclosed in patent literature 1. In the technology disclosed in patent literature 1, at a normal condition, a state is set to a state wherein low speed communication is possible and only while packets are frequently received, a state is set to a state wherein high speed communication is possible. On the other hand, when no packet is received for a fixed time period, the state is changed from the state wherein low speed communication is possible to a temporarily stopped state. Thus, by setting the state to the temporarily stopped state, the power consumption can be reduced compared to a case in which the state wherein high speed communication is possible is always maintained. Further, because the state can be changed to the state wherein high speed communication is possible if needed, data can be received instantaneously. In the technology disclosed in patent literature 1, the RRC state is controlled in such a way and the power consumption of the communication terminal is suppressed totally.

According to the 3GPP (Third Generation Partnership Project) established by the communication standard standardization organization, the RRC state at the time of packet reception is standardized as follows (refer to non-patent literature 1 and non-patent literature 2).

In WCDMA (HSPA), a CELL_DCH (dedicate carrier channel) is allocated to a state wherein high-speed communication is possible, a CELL_FACH (forward direction access channel) is allocated to a state wherein low-speed communication is possible, and a CELL_PCH (paging channel) and a UTRA_Idle (Idle) are allocated to a temporarily stopped state. Here, the power consumption decreases in an order of DCH>FACH>PCH>Idle.

In LTE, an RRC CONNECTED (connection state, CONN) is allocated to the state wherein communication is possible and an RRC IDLE (Idle) is allocated to the temporarily stopped state.

Here, the power consumption decreases in an order of CONN>Idle.

Further, either communication based on LTE or communication based on WCDMA (HSPA) is selected on the basis of a type of a mobile network to which the mobile terminal is connected and circumstances of the moment. Further, in the communication based on these communication standards, the mobile terminal in the temporarily stopped state receives data has to change the state to the state wherein high speed communication is possible or the state wherein low speed communication is possible from the temporarily stopped state.

When the RRC state is changed, a negotiation is needed between a network device and the mobile terminal included in the mobile network. However, it takes a reasonable length of time to complete the negotiation because of a communication delay between the network device and the mobile terminal, a processing time in the network device and the mobile terminal, and the like. Namely, it takes a time to change the state of the mobile terminal from the temporarily stopped state to the state wherein communication is possible in which data can be received. Therefore, when the mobile terminal in the temporarily stopped state receives a reception request from the mobile network, it cannot start to receive the data immediately.

Further, as described in patent literature 1 and the like, when the mobile terminal in the state wherein communication is possible receives no packet for a fixed time period, the state of the mobile terminal is changed to the state wherein low speed communication is possible or the temporarily stopped state. However, a specific value of this fixed time period is determined by the mobile network or the mobile terminal in advance. Further, in the following explanation, a period required for changing the state from the state wherein communication is possible to the temporarily stopped state is called a "non communication transition preparation period". The "non communication transition preparation period" may be generally called as the "inactivity timer length".

On the other hand, a push type communication in which a service provider on the internet distributes an arbitrary message to the mobile terminal at an arbitrary timing starts to be used.

In the WWW (World Wide Web) used on the internet, the pull type communication in which a WWW server on the internet starts to communicate (mainly download) with the terminal by a trigger from the terminal is used. On the one hand, in the push type communication, the service provider's service server on the internet starts to communicate (mainly download) with the terminal by a trigger of a service server side. The push type communication is different in this point from the pull type communication.

Generally, the push type communication is individually installed for each application which provides a service. However, in recent years, from a viewpoint of network utilization efficiency, a general-purpose infrastructure is built as the push service. In this push service infrastructure, a push server or a server called a push proxy gateway (hereinafter, referred to as a "push server" including these servers) is installed in the network of the push provider. The push server receives a push request including a message (push message) to be pushed from the service provider and distributes the message to the mobile terminal on behalf of the service provider.

In patent literature 2, an example of such push server is described. An object of the technology described in patent literature 2 is to safely manage an identifier given to a portable terminal device in an information distribution system using a push notification service. In the technology described in patent literature 2, the identifier given to the portable terminal device is prevented from being leaked or made known by encrypting information in communication between the push server and the Web server included in the information distribution system.

CITATION LIST

Patent Literature

[PTL 1] Japanese Patent Application Laid-Open No. 2010-206807
[PTL 2] Japanese Patent Application Laid-Open No. 2012-230555

Non Patent Literature

[NPL 1] 3GPP TS 25.331: Radio Resource Control (RRC); Protocol specification, [online], [Date of search: Dec. 19, 2012], internet <http://www.3gpp.org/ftp/Specs/archive/25_series/25.331/>
[NPL 2] 3GPP TS 36.331: Evolved Universal Terrestrial Radio Access (E-UTRA); Radio Resource Control (RRC); Protocol specification, [online], [Date of search: Dec. 19, 2012], internet <http://www.3gpp.org/ftp/Specs/archive/36_series/36.331/>

SUMMARY OF INVENTION

Technical Problem

The power consumption of the mobile terminal can be suppressed by using the technology of controlling the RRC state mentioned above. Further, the push message can be distributed to the mobile terminal by installing the technology such as the above mentioned push server or the like.

However, in a case in which the technology of controlling the RRC state is used and also the push type communication is performed, the following problem occurs.

In order to perform push distribution to the mobile terminal, as described above, the RRC state of the mobile terminal has to be set to the state wherein communication is possible before performing the distribution. Accordingly, the following problem occurs. Namely, the state of the terminal whose RRC state is the temporarily stopped state has to be changed from the temporarily stopped state to the state wherein communication is possible as a preparation for receiving a push message. Accordingly, a waiting time is generated after the start of transmission of the push message by the push server until the push message is received by the terminal. Further, the mobile terminal whose RRC state is the state wherein communication is possible can receive the push message immediately when the push server starts to transmit the push message.

When the push server receives the requests at the same time for the distribution of the push message to a plurality of mobile terminals from one or a plurality of service providers, the above-mentioned waiting time may be generated plural times. This case will be described by using a specific example. In this example, it is assumed that the push server receives the request for the distribution of the push message to a first mobile terminal and the request for the distribution of the push message to a second mobile terminal from a plurality of service providers at the same time. Further, it is assumed that the current state of the first mobile terminal is the temporarily stopped state. Further, it is assumed that the current state of the second mobile terminal is the state wherein communication is possible.

In such a situation, it is assumed that the push server determines a distribution sequence in which first, the push message is distributed to the first mobile terminal and then the push message is distributed to the second mobile terminal.

In this case, the distribution of the push message to the second mobile terminal that is performed later is kept waiting until the distribution of the push message to the first mobile terminal is completed after the state of the first mobile terminal is changed to the state wherein communication is possible.

When the second mobile terminal is kept waiting, if the period (non communication transition preparation period) determined by the inactivity timer elapses, the state of the second mobile terminal is changed from the state wherein communication is possible to the temporarily stopped state. Accordingly, in order to perform the push distribution to the second mobile terminal after the distribution of the push message to the first mobile terminal is completed, the state of the second terminal has to be changed to the state wherein communication is possible from the temporarily stopped state again. This results in the increase of the distribution time. As mentioned above, in order to change the state from the temporarily stopped state to the state wherein communication is possible, a predetermined time required for the negotiation and the like are needed. Namely, in this example, as the waiting time, it takes not only "the time required for changing the state of the first mobile terminal from the temporarily stopped state to the state wherein communication is possible" but also "the time required for changing the state of the second mobile terminal from the temporarily stopped state to the state wherein communication is possible again".

At least, "the time required for changing the state of the second mobile terminal from the temporarily stopped state to the state wherein communication is possible" is the time which is not included in the waiting time if the distribution to the second mobile terminal is performed first.

Further, there is a possibility that "the time required for changing the state of the first mobile terminal from the temporarily stopped state to the state wherein communication is possible" may be eliminated if the distribution to the second mobile terminal is performed first. This is because there is a possibility that if the first mobile terminal performs any communication other than the push message distribution during the distribution to the second mobile terminal, the state of the first terminal is changed or just changing to the state wherein communication is possible at the time of distributing the push message.

Thus, when the distribution is performed in an incorrect sequence, the waiting time which is not primarily generated is generated.

Accordingly, an object of the present invention is to provide a message distribution system which can reduce wasteful delays occurring when a mobile terminal whose RRC state is the state wherein communication is possible transfer in the temporarily stopped state, a distribution sequence determination device, a distribution sequence determination method, and a distribution sequence determination program.

Solution to Problem

According to a first aspect of the present invention, a distribution sequence determination device which determines a distribution sequence for a push message transmitted to each of a plurality of terminals and is characterized in that on the basis of whether each of a plurality of the terminals is in a state wherein communication is possible or in a temporarily stopped state, the distribution sequence is determined so as to transmit the push message to each of a plurality of the terminals in the distribution sequence in which the terminal in the state wherein communication is possible is given priority over the terminal in the temporarily stopped state is provided.

According to a second aspect of the present invention, a message distribution system which includes a distribution sequence determination device and a network device and is characterized in that the distribution sequence determination device is the distribution sequence determination device provided by the above-mentioned first aspect of the present invention and the network device distributes a push message to a terminal according to a distribution sequence determined by the distribution sequence determination device is provided.

According to a third aspect of the present invention, a distribution sequence determination method which is used by a device for determining a distribution sequence for a push message transmitted to each of a plurality of terminals and is characterized in that on the basis of whether each of a plurality of the terminals is in a state wherein communication is possible or in a temporarily stopped state, the distribution sequence is determined so as to transmit the push message to each of a plurality of the terminals in the distribution sequence in which the terminal in the state wherein communication is possible is given priority over the terminal in the temporarily stopped state is provided.

According to a fourth aspect of the present invention, a distribution sequence determination program which causes a computer to function as a distribution sequence determination device which determines a distribution sequence for a push message transmitted to each of a plurality of terminals and is characterized in that the distribution sequence determination program causes the computer to function as the distribution sequence determination device which determines the distribution sequence, on the basis of whether each of a plurality of the terminals is in a state wherein communication is possible or in a temporarily stopped state, so as to transmit the push message to each of a plurality of the terminals in the distribution sequence in which the terminal in the state wherein communication is possible is given priority over the terminal in the temporarily stopped state is provided.

Advantageous Effect of Invention

According to the present invention, wasteful delays occurring when a mobile terminal whose RRC state is the state wherein communication is possible transfer in the temporarily stopped state can be reduced.

BRIEF DESCRIPTION OF DRAWINGS

Further, the above-mentioned object, the other object, features, and advantages of the present invention will be apparent from the following description of the preferred extemporary embodiments and the following accompanying drawings thereof, in which

FIG. 6 is a flowchart showing a basic operation of estimating an RRC state of a mobile terminal by a terminal state estimation unit in a second exemplary embodiment of the present invention.

Figure 1:
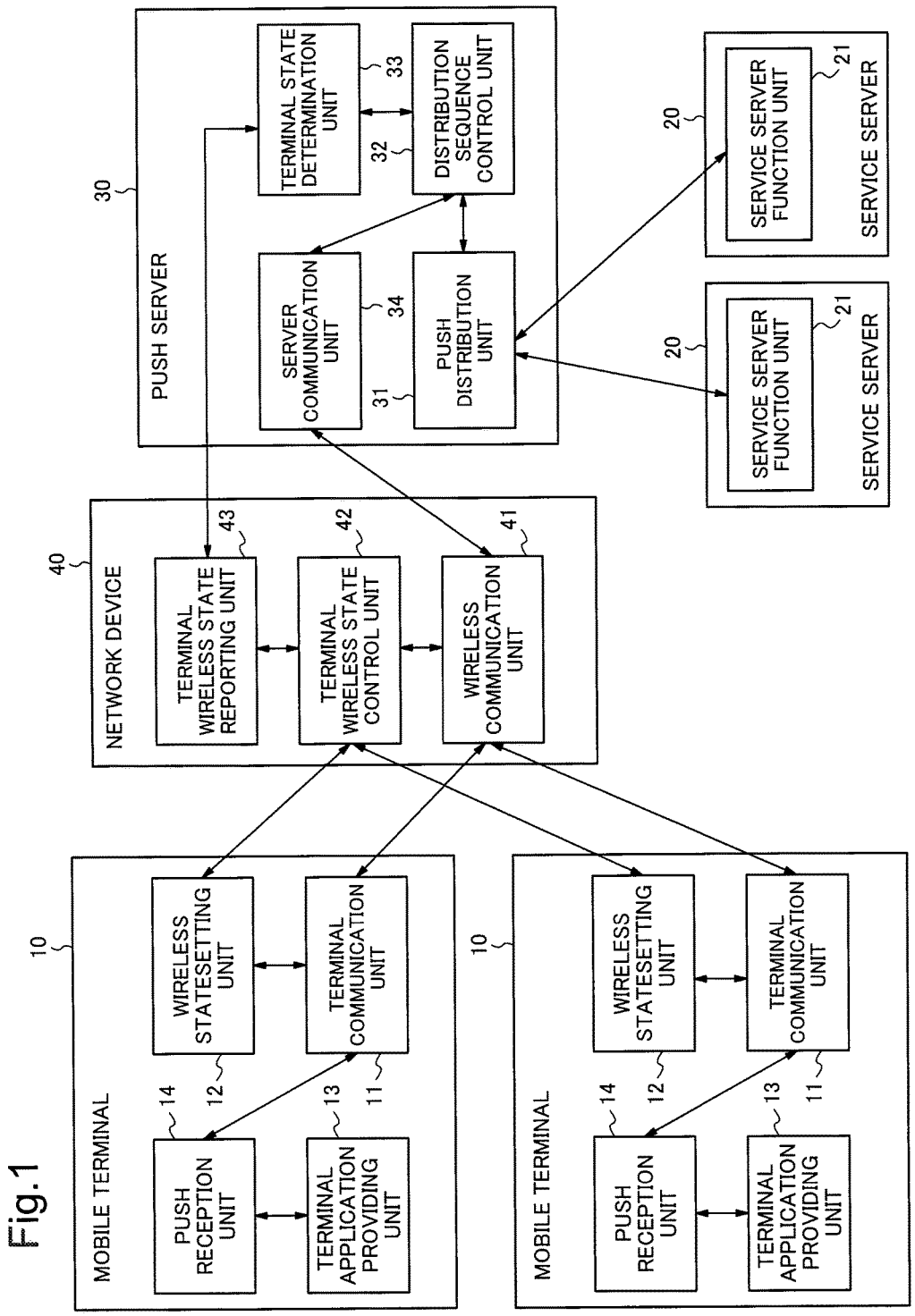
FIG. 1 is a functional block diagram showing a basic configuration of a first exemplary embodiment of the present invention.

REFERENCE SIGNS LIST 10 mobile terminal
terminal communication unit
12 wireless state setting unit
13 terminal application providing unit
14 push reception unit
20 service server
21 service server function unit
30 push server
31 push distribution unit
32 distribution sequence control unit
33 terminal state determination unit
34 server communication unit
35 terminal state estimation unit
40 network device
wireless communication unit
42 terminal wireless state control unit
43 terminal wireless state reporting unit

DESCRIPTION OF EMBODIMENTS

Next, a basic configuration of a message distribution system according to a first exemplary embodiment of the present invention will be described with reference to FIG. 1.

Referring to FIG. 1, this exemplary embodiment includes a plurality of mobile terminals 10, one or more service servers 20, a push server 30, and a network device 40. The network device 40 is connected to each mobile terminal 10 by a wireless communication network (not shown). Here, this wireless communication network is realized on the basis of a wireless communication system in which the RRC state can be changed. On the one hand, the push server 30 is connected to the service server 20 and the network device 40 by a wired network or a wireless network (not shown). This network can be realized on the basis of an arbitrary standard. The network may be realized by a dedicated line or a public network such as the internet or the like. Further, in this exemplary embodiment, it is assumed that the push server 30 is connected to the service server 20 and the network device 40 by the wired network.

The mobile terminal 10 is a terminal which is carried and directly operated by a user. The service server 20 is a server which provides a service to the user in cooperation with the mobile terminal 10. The push server 30 is a server which relays the push message that is distributed to the mobile terminal 10 from the service server 20. The network device 40 is a device which transmits a message distribution request received from the push server 30 to the mobile terminal 10 via the wireless network.

Further, in FIG. 1, two mobile terminals 10 are shown. However, the number of the mobile terminals 10 is not limited to this number. In this exemplary embodiment, the number of the mobile terminals 10 is arbitrarily determined. Similarly, the number of the service servers 20, the number of the push servers 30, and the number of the network devices 40 are arbitrarily determined. Each server may be realized as an independent server device. However, one server device may have a function to realize a plurality of severs. Further, a plurality of servers may cooperate with each other to realize the function of one server. Namely, a configuration shown in FIG. 1 is shown as an example. Therefore, the configuration of this exemplary embodiment is not limited to the configuration shown in FIG. 1.

Next, each function block of each device will be described.

The mobile terminal 10 includes a terminal communication unit 11, a wireless state setting unit 12, a terminal application providing unit 13, and a push reception unit 14.

The terminal communication unit 11 is a unit which transmits/receives data to/from the push server 30. Specifically, the terminal communication unit 11 transmits/receives the data to/from the push server 30 via the network device 40. In this communication, the terminal communication unit 11 communicates with the network device 40 via the wireless network.

The wireless state setting unit 12 grasps a communication frequency of the mobile terminal 10 by monitoring the terminal communication unit 11. The wireless state setting unit 12 sets the RRC state to the terminal communication unit 11 on the basis of the grasped communication frequency of the mobile terminal 10 or an instruction from the network device 40. As the RRC state to be set, for example, a high-speed communication state, a low-speed communication state, a temporarily stopped state, or the like are used.

The terminal application providing unit 13 is an application which provides a service to the user actually. Application software and hardware operate in cooperation with each other and whereby, the terminal application providing unit 13 is realized. In FIG. 1, one terminal application providing unit 13 is included in the mobile terminal 10. However, a plurality of different terminal application providing units 13 may be included in the mobile terminal 10. Namely, a plurality of different application software may be installed in the mobile terminal 10.

When the type of the data received by the terminal communication unit 11 is the push message, the push reception unit 14 distributes this push message to the terminal application providing unit 13 specified by this push message.

The service server 20 includes a service server function unit 21 which is a unit which causes the server device to function as a service server. The service server function unit 21 operates in cooperation with the terminal application providing unit 13 operating on the mobile terminal 10 and provides the service to the user. The program for realizing the service server operates in cooperation with the server device and whereby, the service server function unit 21 is realized.

The push server 30 includes a push distribution unit 31, a distribution sequence control unit 32, a terminal state determination unit 33, and a server communication unit 34.

The push distribution unit 31 receives a request for the distribution of the push message to the mobile terminal 10 from the service server function unit 21. When the push distribution unit 31 receives the push message distribution request, the push distribution unit 31 identifies the mobile terminal 10 specified by the distribution request and requests the distribution sequence control unit 32 to distribute the push message to the identified mobile terminal 10. Hereinafter, in the explanation, the mobile terminal 10 specified by the distribution request is appropriately called a "distribution destination mobile terminal 10".

The distribution sequence control unit 32 distributes the push message to the distribution destination mobile terminal 10 according to the request from the push distribution unit 31. The distribution sequence control unit 32 does not merely distribute the push message according to the order of the requests. The distribution sequence control unit 32 controls the distribution sequence for the push message according to the RRC state of the distribution destination mobile terminal 10. The method for controlling the distribution sequence used in the distribution sequence control unit 32 will be specifically described later.

The terminal state determination unit 33 acquires information of the RRC state of the mobile terminal 10 in cooperation with the network device 40. The terminal state determination unit 33 sends the acquired information of the RRC state to the distribution sequence control unit 32.

The server communication unit 34 transmits the push message to the distribution destination mobile terminal 10 via the network device 40 in the sequence determined by the distribution sequence control unit 32.

The network device 40 includes a wireless communication unit 41, a terminal wireless state control unit 42, and a terminal wireless state reporting unit 43.

The wireless communication unit 41 is a unit which relays communication between a server device group (the push server 30 and the service server 20) connected by the wired network and the mobile terminals 10 connected by the wireless network. Specifically, the wireless communication unit 41 converts the data transmitted by the server device group into data for the wireless communication network and transmits it to the mobile terminal 10. The wireless communication unit 41 converts the data transmitted by the mobile terminal 10 into data for the wired communication network and transmits it to the server device group.

The terminal wireless state control unit 42 monitors the state of the wireless communication to each mobile terminal 10. When the target mobile terminal 10 does not communicate with another mobile terminal for a predetermined time or the terminal wireless state control unit 42 is notified of the change of the RRC state from the wireless state setting unit 12 of the target mobile terminal 10, the terminal wireless state control unit 42 changes the RRC state of the target mobile terminal 10. Specifically, the terminal wireless state control unit 42 communicates with the wireless state setting unit 12 of the target mobile terminal 10 and changes the RRC state of the mobile terminal 10.

The terminal wireless state reporting unit 43 receives a search request about the RRC state of the mobile terminal 10 specified by the terminal state determination unit 33 of the push server 30. The terminal wireless state reporting unit 43 transmits information of the RRC state of the specified mobile terminal 10 to the terminal state determination unit 33 of the push server 30 as a reply.

Each function block of this exemplary embodiment has been explained above in detail. Further, for convenience of explanation, only the function block related to this exemplary embodiment is shown in FIG. 1. Namely, this does not intend to prohibit the use of the function block other than the function block shown in FIG. 1. Each function block shown in FIG. 1 may be used for only the operation unique to this exemplary embodiment. However, each function block can be used for another use as a general-purpose function block. For example, various types of the terminal application providing units 13 and the processes operate on the mobile terminal 10 although these units and processes are not shown in FIG. 1. Each of these applications and processes performs communication by using the terminal communication unit 11 at an arbitrary timing. The network device 40 uses a function other than the function provided by the function block shown in FIG. 1 or the like with a part of the function provided by the function block or without the function provided by the function block and whereby, the network device 40 is connected to various servers other than the push server 30 and the wired network and communicates with the mobile terminal 10 at the arbitrary timing.

Further, the wireless state setting unit 12 of the mobile terminal 10 and the terminal wireless state control unit 42 of the network device 40 monitor the wireless communication state in each mobile terminal 10 at a time other than the time for distributing the push message. When the target mobile terminal 10 does not communicate with another mobile terminal for a predetermined time or the terminal wireless state control unit 42 is notified of the change of the RRC state from the wireless state setting unit 12 of the target mobile terminal 10, the terminal wireless state control unit 42 changes the RRC state of the target mobile terminal 10 to the temporarily stopped state. Namely, in a case in which the push message is not distributed for a predetermined time but the mobile terminal 10 communicates with another mobile terminal by wireless communication, the RRC state of the mobile terminal 10 may not be changed to the temporarily stopped state. Further, when data is transmitted from the network device 40 to the mobile terminal 10, if the RRC state of the mobile terminal 10 is the temporarily stopped state, the RRC state is changed to the high-speed communication state or the low-speed communication state. Further, the mechanism for changing the RRC state is described in non-patent literature 1 and non-patent literature 2 and known by the person skilled in the art. Therefore, the detailed description will be omitted here.

Next, the entire operations of the exemplary embodiment will be described with reference to a functional block diagram shown in FIG. 1 and a flowchart shown in FIG. 2 and FIG. 4.

First, a service server function unit 21 transmits a request for the distribution of the push message to the specified mobile terminal 10 (it corresponds to the distribution destination mobile terminal 10) to the push server 30 at an arbitrary timing.

This timing is determined by a content of the service provided by the service server function unit 21. This will be explained by taking a case in which the service server function unit 21 provides a chat service as an example. In this case, when the service server function unit 21 receives a chat message to a certain user's mobile terminal 10, the distribution of the push message is performed at a timing at which information indicating the reception of the chat message is transmitted to the certain user's mobile terminal 10.

One distribution destination mobile terminal 10 may be used or a plurality the distribution destination mobile terminals 10 may be used. Namely, as the distribution destination of one push message, only one mobile terminal 10 may be specified or a plurality of the mobile terminals 10 may be specified. For example, in a case in which three or more persons in one group just use chat messaging, the chat message created by one user in the group is distributed to the mobile terminals 10 of two users other than the user who creates the chat message in the group as the push message.

Further, in order to specify the distribution destination mobile terminal 10, an arbitrary ID character string may be used or information such as an IP address (Internet Protocol address) or the like that is specified in the network may be used.

When the push distribution unit 31 of the push server 30 receives the push message distribution request (Step S101), it identifies the distribution destination mobile terminal 10 on the basis of the information for identifying the distribution destination mobile terminal 10 specified by the distribution request (Step S102). Next, the push distribution unit 31 associates the identified distribution destination mobile terminal 10 with the push message and sends them to the distribution sequence control unit 32.

Next, the distribution sequence control unit 32 makes an inquiry about the RRC state of the distribution destination mobile terminal 10 to the terminal state determination unit 33, receives the answer, and thereby, acquires information of the RRC state of the distribution destination mobile terminal 10 (Step S103).

Here, the process of step S103 will be described in more detail. In step S103, as mentioned above, the terminal state determination unit 33 receives an inquiry about the RRC state of the distribution destination mobile terminal 10 from the distribution sequence control unit 32. The distribution sequence control unit 32 which receives the inquiry identifies the network device 40 that manages the distribution destination mobile terminal 10. Further, in order to identify the network device 40, the inquiry about whether or not to manage the distribution destination mobile terminal 10 may be made to each network device 40 or communication with each network device 40 may be periodically performed to grasp the network device 40 which manages the mobile terminal 10. Next, the distribution sequence control unit 32 makes an inquiry about the RRC state of the distribution destination mobile terminal 10 to the terminal wireless state reporting unit 43 included in the identified network device 40.

The terminal wireless state reporting unit 43 of the network device 40 which receives the inquiry acquires information of the RRC state of the distribution destination mobile terminal 10 from the terminal wireless state control unit 42 and sends it to the terminal state determination unit 33 as a reply. Further, the terminal state determination unit 33 sends information of the RRC state of the distribution destination mobile terminal 10 to the distribution sequence control unit 32 as a reply. As a result, the distribution sequence control unit 32 can acquire information of the RRC state of the distribution destination mobile terminal 10.

Further, as mentioned above, the terminal wireless state control unit 42 of the network device 40 communicates with the wireless state setting unit 12 of the mobile terminal 10 and always grasps the RRC state of the mobile terminal 10.

As mentioned above, in step S103, information of the RRC state of the distribution destination mobile terminal 10 can be acquired. Here, a content of the acquired information is different for each type of the wireless communication network and the communication standard to which the wireless communication network conforms.

In this exemplary embodiment, it is assumed that information about whether the state of the mobile terminal is "the state wherein communication is possible" or "the temporarily stopped state" is included in the information of the RRC state. Further, the "state wherein communication is possible" can be further divided into two or more states: for example, "a state wherein high speed communication is possible" and "a state wherein low speed communication is possible". However, in this exemplary embodiment, "the state wherein communication is possible" is not further divided.

There is a case in which information of "allowable no communication period" can be acquired as the information of the RRC state in addition to the information about whether the state of the mobile terminal is the "state wherein communication is possible" or the "temporarily stopped state". Here, the "allowable no communication period" is a period of time from a current time to an end time of a no communication state at which the state is changed from a current state that is the "state wherein communication is possible" to the temporarily stopped state. For example, in a case in which the current state is "the state wherein communication is possible" and the "allowable no communication period" is 5 seconds, at the present time, the communication with the distribution destination mobile terminal 10 can be achieved. However, when the distribution destination mobile terminal 10 is in the no-communication state for continuous 5 seconds, the "allowable no communication period" is reduced every moment and when the "allowable no communication period" is reduced to zero, the state of the distribution destination mobile terminal is changed to the "temporarily stopped state" and the communication cannot be immediately performed. On the other hand, when a communication event occurs in this time period of 5 seconds (in other words, when any packet including the push message is transmitted/received in the time period of 5 seconds), this allowable no communication period is reset to a predetermined length. This predetermined length corresponds to the non communication transition preparation period described in the background art.

Namely, in this exemplary embodiment, the allowable no communication period is calculated by a formula of: "non communication transition preparation period—period of time elapsed after last packet transmission/reception".

Next, a process of step S104 will be described. First, the distribution sequence control unit 32 confirms whether the acquired RCC state of the distribution destination mobile terminal 10 is the "state wherein communication is possible" or the "temporarily stopped state" (Step S104).

When the RRC state of the distribution destination mobile terminal 10 is the "temporarily stopped state" ("No" in step S104), the distribution sequence control unit 32 instructs the server communication unit 34 to distribute the push message to the distribution destination mobile terminal 10 that is a current sequence determination target after the distribution of another push message that is currently kept waiting for distribution (Step S105). This because it makes no sense to try to transmit the push message to the distribution destination mobile terminal 10 in the "temporarily stopped state" because the transmission cannot be performed and efficiency is improved when another push messages is transmitted before the push message to such distribution destination mobile terminal 10 is transmitted.

When the RRC state of the distribution destination mobile terminal 10 is the "state wherein communication is possible" ("Yes" in step S104), the distribution sequence control unit 32 performs a process of step S106.

In step S106, the distribution sequence control unit 32 confirms whether or not information of the "allowable no communication period" can be acquired as information of the RCC state (Step S106).

In this case, when the distribution sequence control unit 32 can acquire only the information about whether the RRC state of the distribution destination mobile terminal 10 is the "state wherein communication is possible" or the "temporarily stopped state" and cannot acquire information of the "allowable no communication period" as information of the RRC state ("No" in step S106), the process proceeds to step S107. The distribution sequence control unit 32 instructs the server communication unit 34 to distribute the push message to the distribution destination mobile terminal 10 that is the current sequence determination target before distributing the push message to another distribution destination mobile terminal 10 in the "temporarily stopped state" (Step S107). This is because when the push message is distributed to the distribution destination mobile terminal 10 whose current state is the "state wherein communication is possible", the distribution can be performed without the waiting time but when the push message is distributed to the distribution destination mobile terminal 10 whose state is the "temporarily stopped state", the waiting time is required for the distribution and the former case is preferable to the later.

On the one hand, when the distribution sequence control unit 32 can acquire the information of the "allowable no communication period" in addition to the information about whether the RRC state of the distribution destination mobile terminal 10 is the "state wherein communication is possible" or the "temporarily stopped state", as information of the RRC state ("Yes" in step S106), the process proceeds to step S108. The distribution sequence control unit 32 instructs the server communication unit 34 to distribute the push message to the mobile terminal 10 that is the current sequence determination target before distributing the push message to the following two types of the distribution destination mobile terminals 10 (Step S108), (1) another distribution destination mobile terminal 10 in the "temporarily stopped state" and (2) another distribution destination mobile terminal 10 whose state is "state wherein communication is possible" and whose allowable no communication period is longer than that of distribution destination mobile terminal 10 that is current sequence determination target.

This is because when the push message is distributed to the distribution destination mobile terminal 10 whose current state is the "state wherein communication is possible", the distribution can be performed without the waiting time but when the push message is distributed to the distribution destination mobile terminal 10 whose state is the "temporarily stopped state", the waiting time is required for the distribution and the former case is preferable to the later.

Further, this is because when the push message is distributed to the distribution destination mobile terminal 10 whose current state is the "state wherein communication is possible" and expected to be changed to the "temporarily stopped state" soon (namely, the allowable no communication period is short) before distributing the push message to the distribution destination mobile terminal 10 whose state is the "state wherein communication is possible" and not expected to be changed to the "temporarily stopped state" soon (namely, the allowable no communication period is long), an efficiency of distribution can be totally improved. Namely, this is because a possibility that the state of the distribution destination mobile terminal 10 to which the push message is distributed is the "temporarily stopped state" can be totally reduced.

The instruction to distribute the push message to the mobile terminal 10 that is the current sequence determination target is issued after the instruction to distribute the push message to another mobile terminal 10 whose state is the "state wherein communication is possible" and whose allowable no communication period is equal to or shorter than that of the distribution destination mobile terminal 10 that is the current sequence determination target.

Because the message distributed to another distribution destination mobile terminal 10 whose state is the "state wherein communication is possible" and of which the information of the allowable no communication period cannot be acquired is controlled so as to be transmitted on the highest priority basis in step S107, it is not a comparison target.

The determination of the distribution sequence for the push message that is performed in steps S101 to S108 described above will be described by using a conceptual rendering shown in FIG. 3.

Figure 3:
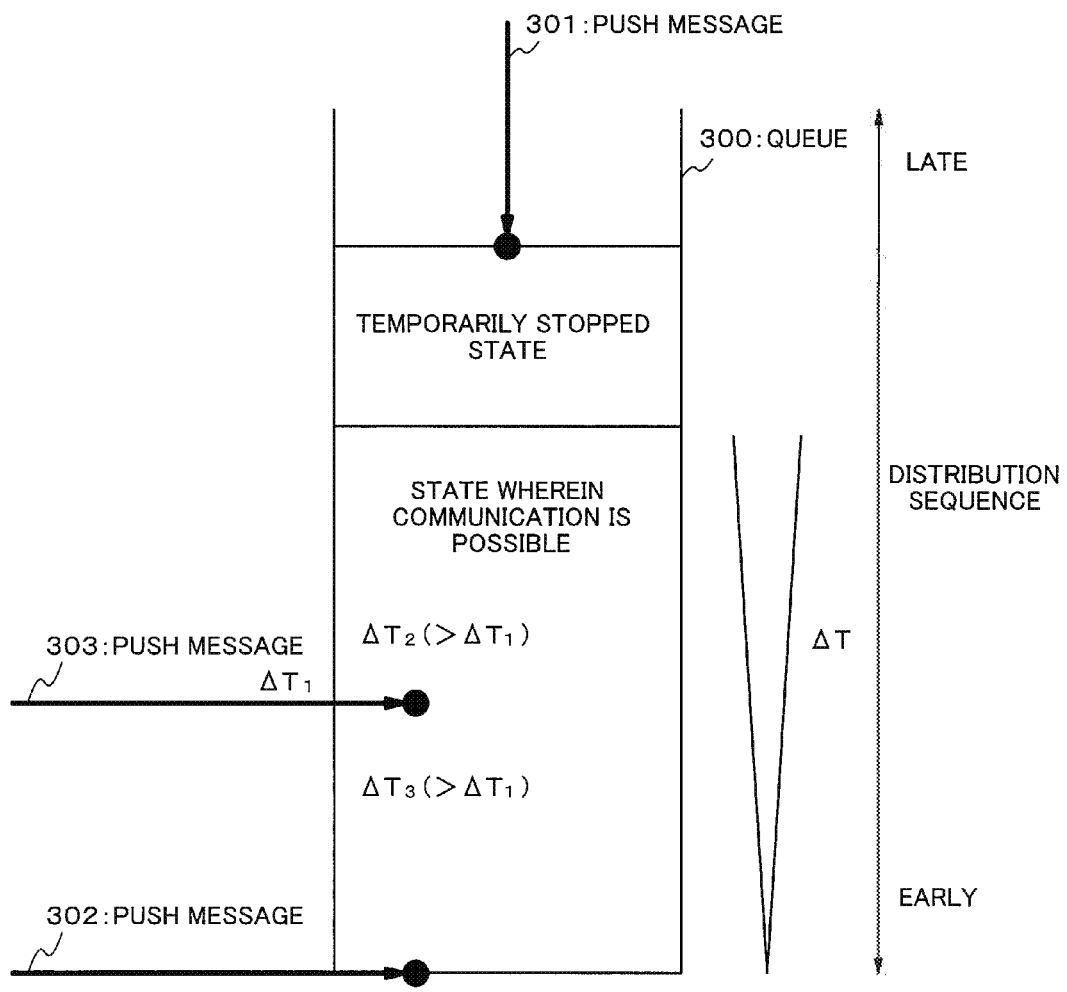
FIG. 3 is a conceptual rendering showing a distribution sequence for a push message as a queue in each exemplary embodiment of the present invention.

FIG. 3 shows a queue 300 in which the distribution sequence for the push message is represented as a queue. In the queue 300 of FIG. 3, an early distributed message is located at a position lower than a position at which a late distributed message is located. Namely, the push message located at the lowest position is distributed first and the push message located at the top position is distributed last. In other words, in the queue 300, the push message with high priority is located at a position lower than a position at which the push message with low priority is located.

In the queue 300, the push message distributed to the distribution destination mobile terminal 10 in the state wherein communication is possible is located at a position lower than a position at which the push message distributed to the distribution destination mobile terminal 10 in the temporarily stopped state is located. However, one example is shown in FIG. 3. Therefore, a case in which all the distribution destination mobile terminals 10 are in the temporarily stopped state or a case in which all the distribution destination mobile terminals 10 are in the state wherein communication is possible may occur.

Further, in FIG. 3, the allowable no communication period is represented by "ΔT". In the queue 300, in a case in which a plurality of the push messages distributed to the mobile terminals 10 that are in the state wherein communication is possible exist, the push message distributed to the distribution destination mobile terminal 10 whose allowable no communication period ΔT is short is located at a position lower than a position at which the push message distributed to the distribution destination mobile terminal 10 whose allowable no communication period ΔT is large is located.

A case in which a new push message is added in this queue 300 will be described.

First, a case in which the state of the distribution destination mobile terminal 10 that is the current sequence determination target is the temporarily stopped state, in other words, a determination of "No" is made in step S104 and the process proceeds to step S105 will be described. In this case, the push message that is the current sequence determination target is distributed after another push message (regardless of whether the state of the distribution destination mobile terminal 10 is the temporarily stopped state or the state wherein communication is possible) is distributed. Therefore, the push message that is the current sequence determination target is located at the last of the queue 300 as shown as a push message 301.

Next, a case in which the distribution destination mobile terminal 10 that is the current sequence determination target, whose state is the state wherein communication is possible and of which the information of the allowable no communication period cannot be acquired will be described. In other words, a case in which a determination of "Yes" is made in step S104, a determination of "No" is made in step S106, and the process proceeds to step S107 will be described. In this case, the push message that is the current sequence determination target is distributed before all the other push messages (regardless of whether the state of the distribution destination mobile terminal 10 is the temporarily stopped state or the state wherein communication is possible) are distributed. Therefore, the push message that is the current sequence determination target is located at the head of the queue 300 as shown as a push message 302.

Next, a case in which the distribution destination mobile terminal 10 that is the current sequence determination target, whose state is the state wherein communication is possible and of which the information of the allowable no communication period can be acquired will be described. In other words, a case in which a determination of "Yes" is made in step S104, a determination of "Yes" is made in step S106, and the process proceeds to step S108 will be described. In this case, the push message that is the current sequence determination target is distributed before distributing the push message to the following two types of the distribution destination mobile terminals 10, (1) another distribution destination mobile terminal 10 in the "temporarily stopped state" and (2) another distribution destination mobile terminal 10 whose state is the "state wherein communication is possible" and whose allowable no communication period is longer than that of the distribution destination mobile terminal 10 that is the current sequence determination target. Here, it is assumed that the allowable no communication period of the mobile terminal 10 that is the current sequence determination target is ΔT1. In this case, in the queue 300, the push message distributed to the mobile terminal 10 that is the current sequence determination target is located at a position that is lower than a position at which the push message distributed to the mobile terminal 10 in the temporarily stopped state is located, lower than a position at which the push message distributed to the mobile terminal 10 whose allowable no communication period is ΔT2 (>ΔT1) is located, and upper than a position at which the push message distributed to the mobile terminal 10 whose allowable no communication period is ΔT3 (<ΔT1) is located. Therefore, the push message that is the current sequence determination target as a push message 303.

Here, whenever the distribution sequence is determined, the allowable no communication period ΔT at the time of determining the distribution sequence can be calculated by a formula of: "non communication transition preparation period—period of time elapsed after last packet transmission/reception" for all the push messages included in the queue 300 at a present time.

However, the process for acquiring information of the current non communication transition preparation period for all the push messages whenever the distribution sequence is determined becomes complicated. Accordingly, the current allowable no communication period ΔT may be calculated as follows.

For example, with respect to the push message of which the allowable no communication period ΔT is calculated once, the calculated allowable no communication period ΔT (it is represented by ΔT') may be held and reduced according to the elapsed time. For example, when the allowable no communication period ΔT is counted by "seconds", one second is subtracted from the allowable no communication periods ΔT' of all the push messages included in the current queue 300 for each elapsed time of one second and the value after the subtraction may be used as the current allowable no communication period ΔT.

The allowable no communication period ΔT' and the time at which the allowable no communication period ΔT' is calculated may be held. When the current allowable no communication period ΔT is calculated, a time difference between a time t1 at which the allowable no communication period ΔT' is calculated and a current time t2 is calculated and the calculated time difference may be subtracted from the allowable no communication period ΔT'. Namely, the current allowable no communication period ΔT may be calculated by the following equation: "ΔT=ΔT'−(current time t2−time t1 at which ΔT' is calculated)".

Figure 2:
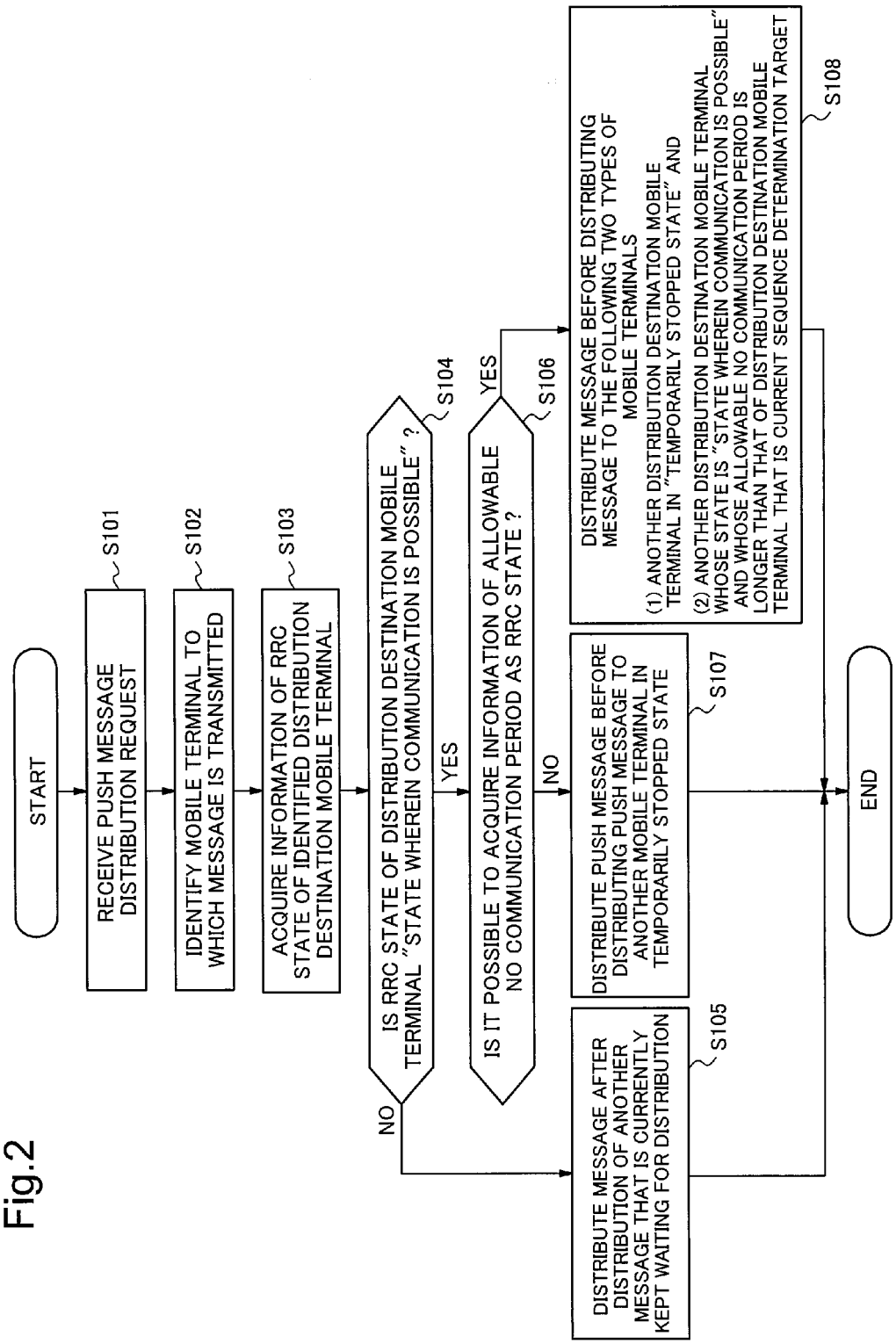
FIG. 2 is a flowchart showing a basic operation for controlling a distribution sequence for a push message in each exemplary embodiment of the present invention.

Further, in the method explained by using FIG. 2 and FIG. 3, the distribution destination mobile terminal 10 whose state is the "state wherein communication is possible" and of which the information of the allowable no communication period cannot be acquired from the terminal has the allowable no communication period of zero.

This is because the allowable no communication period of the distribution destination mobile terminal 10 whose state is the "state wherein communication is possible" and of which the information of the allowable no communication period cannot be acquired from the terminal is not known and it is treated as zero. Further, this is because, by this treatment, a policy in which a possibility that the state of the distribution destination mobile terminal 10 is changed from the state wherein communication is possible to a communication temporarily stopped state can be greatly reduced is adopted.

However, without adopting such policy, the value of an allowable wireless communication period of the allowable no communication period of the distribution destination mobile terminal 10 whose state is the "state wherein communication is possible" and of which the information of the allowable no communication period cannot be acquired from the terminal is set to an average allowable wireless communication period and a process similar to the process of step S108 may be performed. Namely, when this process is explained by using FIG. 3, the push message is not treated like the push message 302, the average allowable wireless communication period is set to the allowable no communication period ΔT1, and then the push message may be treated like the push message 303. Here, for example, the average allowable wireless communication period may be an average value or the like of N allowable wireless communication periods that are acquired by the latest acquisition or a predetermined value.

Next, the operation in which the push message is transmitted according to the distribution sequence determined by the distribution sequence control unit 32 will be described with reference to FIG. 4.

The server communication unit 34 reads the push message in the distribution sequence specified by the distribution sequence control unit 32 and requests the network device 40 to start to communicate with the distribution destination mobile terminal 10 associated with the push message (Step S201). At this time, when the distribution destination mobile terminal 10 to which the push message is distributed is specified, a method determined for each type of the network such as an IP network or the like is used. For example, in a case of the IP network, the distribution destination mobile terminal 10 is specified by the IP address.

When the wireless communication unit 41 of the network device 40 is requested to start to communicate with the mobile terminal 10, it requests the terminal wireless state control unit 42 to establish a communication bearer (Step S202).

The terminal wireless state control unit 42 communicates with the wireless state setting unit 12 of the distribution destination mobile terminal 10 and establishes the communication bearer between the terminal communication unit 11 of the mobile terminal 10 and the wireless communication unit 41 of the network device 40 (Step S203). In this process, as described in the background art, if the RRC state of the distribution destination mobile terminal 10 is the "temporarily stopped state", it takes much time until the RRC state is changed to the state wherein communication is possible and whereby, it takes much time until the communication bearer is established.

When the communication bearer is established, the server communication unit 34 of the push server 30 transmits the push message to the wireless communication unit 41 of the network device 40 and the network device 40 transmits the push message to the terminal communication unit 11 of the distribution destination mobile terminal 10 on the established bearer (Step S204).

The terminal communication unit 11 sends the push message to the push reception unit 14. The push reception unit 14 refers to information for identifying the distribution destination of the push message and identifies the terminal application providing unit 13 that is the final distribution destination of the message that is described in the push message. The push reception unit 14 sends the push message to the identified terminal application providing unit 13. The terminal application providing unit 13 reads a content of the push message and provides a service to the user.

This exemplary embodiment described above has an effect in which the delay on push distribution that occurs when the mobile terminal whose RRC state is the state wherein communication is possible transfers in the temporarily stopped state can be prevented because the distribution sequence is appropriately determined on the basis of the RRC state of the mobile terminal.

Next, a basic configuration of a second exemplary embodiment of the present invention will be described with reference to FIG. 5. In the first exemplary embodiment, information of the RRC state of the distribution destination mobile terminal 10 is acquired from the terminal wireless state control unit 42. However, in the second exemplary embodiment, the RRC state of the distribution destination mobile terminal 10 is estimated on the basis of a communication history of the distribution destination mobile terminal 10. This is a difference between the first exemplary embodiment and the second exemplary embodiment. In the following explanation, the difference between the first exemplary embodiment and the second exemplary embodiment will be described mainly.

Figure 5:
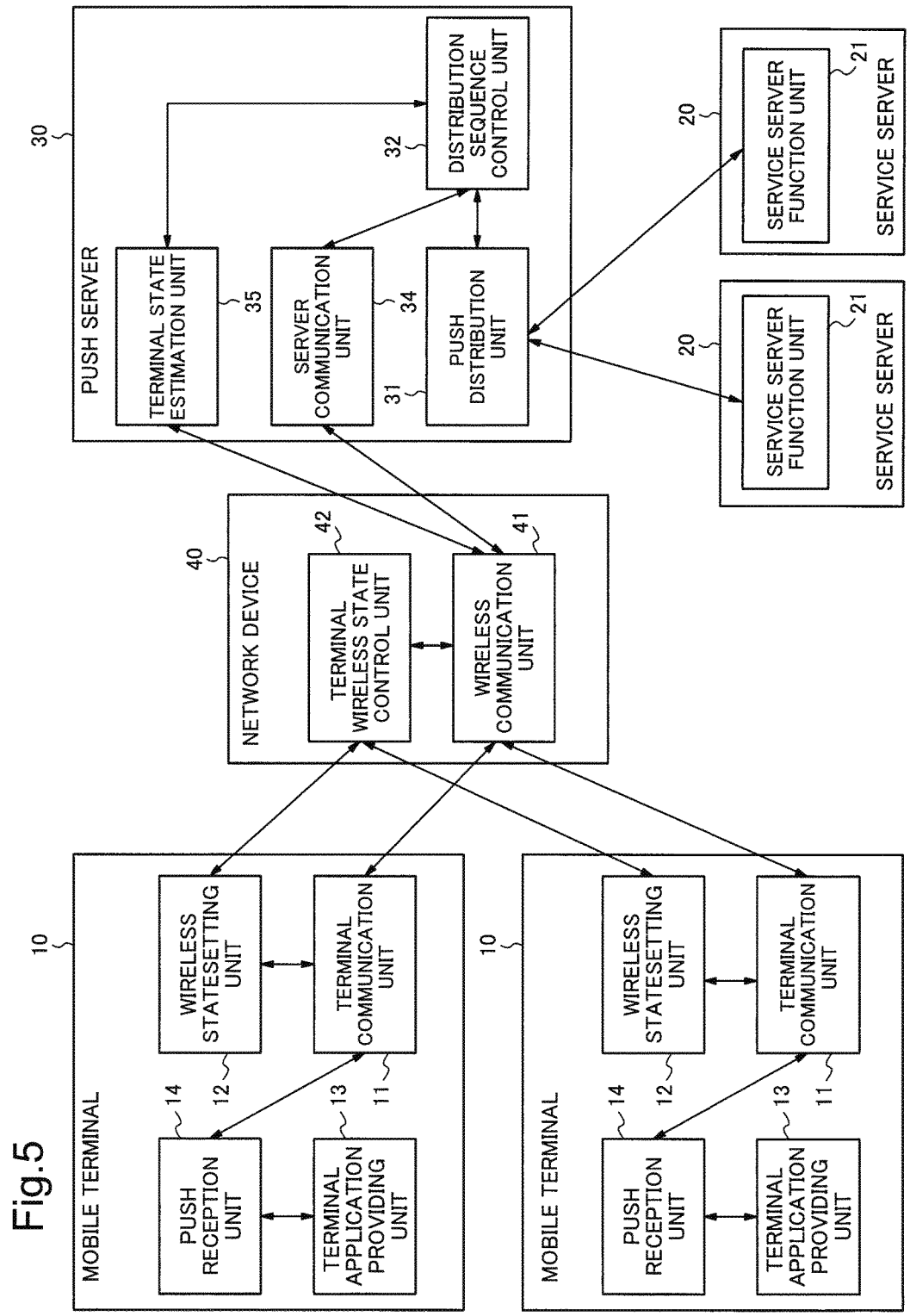
FIG. 5 is a functional block diagram showing a basic configuration of a second exemplary embodiment of the present invention.

Referring to FIG. 5, this exemplary embodiment includes the mobile terminal 10, the service server 20, the push server 30, and the network device 40 like the first exemplary embodiment.

The configurations of the mobile terminal 10 and the service server 20 according to the second exemplary embodiment are the same as those according to the first exemplary embodiment. Therefore, the description of these devices will be omitted here.

The push server 30 includes the push distribution unit 31, the distribution sequence control unit 32, the server communication unit 34, and a terminal state estimation unit 35. The push server 30 according to the second exemplary embodiment includes the terminal state estimation unit 35 and does not include the terminal state determination unit 33 included in the push server 30 according to the first exemplary embodiment.

The terminal state estimation unit 35 grasps the non communication transition preparation period. As described in the background art, the non communication transition preparation period is the period in which the state is changed from the state wherein communication is possible to the temporarily stopped state when no packet is received and it is set on the basis of the type of the network or the mobile terminal 10. The terminal state estimation unit 35 grasps the non communication transition preparation period based on the type of the network to which each mobile terminal 10 is connected or the mobile terminal 10. The terminal state estimation unit 35 cooperates with the network device 40 and acquires the communication history of the mobile terminal 10. The terminal state estimation unit 35 estimates the RRC state of the mobile terminal 10 on the basis of the grasped non communication transition preparation period and the communication history. A specific estimation method will be described later.

In this exemplary embodiment, as described above, the terminal state estimation unit 35 estimates the RRC state. Therefore, the terminal state determination unit 33 used for acquiring information of the RRC state in the first exemplary embodiment is eliminated. Because the function block other than the above-mentioned function block of the push server 30 is the same as that of the first exemplary embodiment. Therefore, the description will be omitted.

The network device 40 includes the wireless communication unit 41 and the terminal wireless state control unit 42. The network device 40 according to the second exemplary embodiment does not include a terminal state reporting unit 43 and a part of the function of the wireless communication unit 41 according to the second exemplary embodiment is different from that of the wireless communication unit 41 according to the first exemplary embodiment.

Specifically, the wireless communication unit 41 according to the second exemplary embodiment relays communication between the server device group (the push server 30 and the service server 20) connected by the wired network and the mobile terminals 10 connected by the wireless network. This function of the wireless communication unit 41 according to the second exemplary embodiment is the same as that of the wireless communication unit 41 according to an exemplary embodiment 1. However, the wireless communication unit 41 according to the second exemplary embodiment further has a function to notify the terminal state estimation unit 35 of information about a start time of relay of communication of the specified mobile terminal 10.

In this exemplary embodiment, as described above, the terminal state estimation unit 35 estimates the RRC state. Therefore, the terminal state reporting unit 43 used for acquiring information of the RRC state in the first exemplary embodiment is not used. Accordingly, in the exemplary embodiment 1, the terminal state determination unit 33 communicates with a terminal communication state reporting unit 43 of the network device 40 but in an exemplary embodiment 2, the terminal state estimation unit 35 communicates with the wireless communication unit 41 of the network device 40. The function block other than the above-mentioned function block of the network device 40 is the same as that of the network device 40 according to the first exemplary embodiment. Therefore, the description will be omitted.

Next, the operation of this exemplary embodiment will be described.

Figure 4:
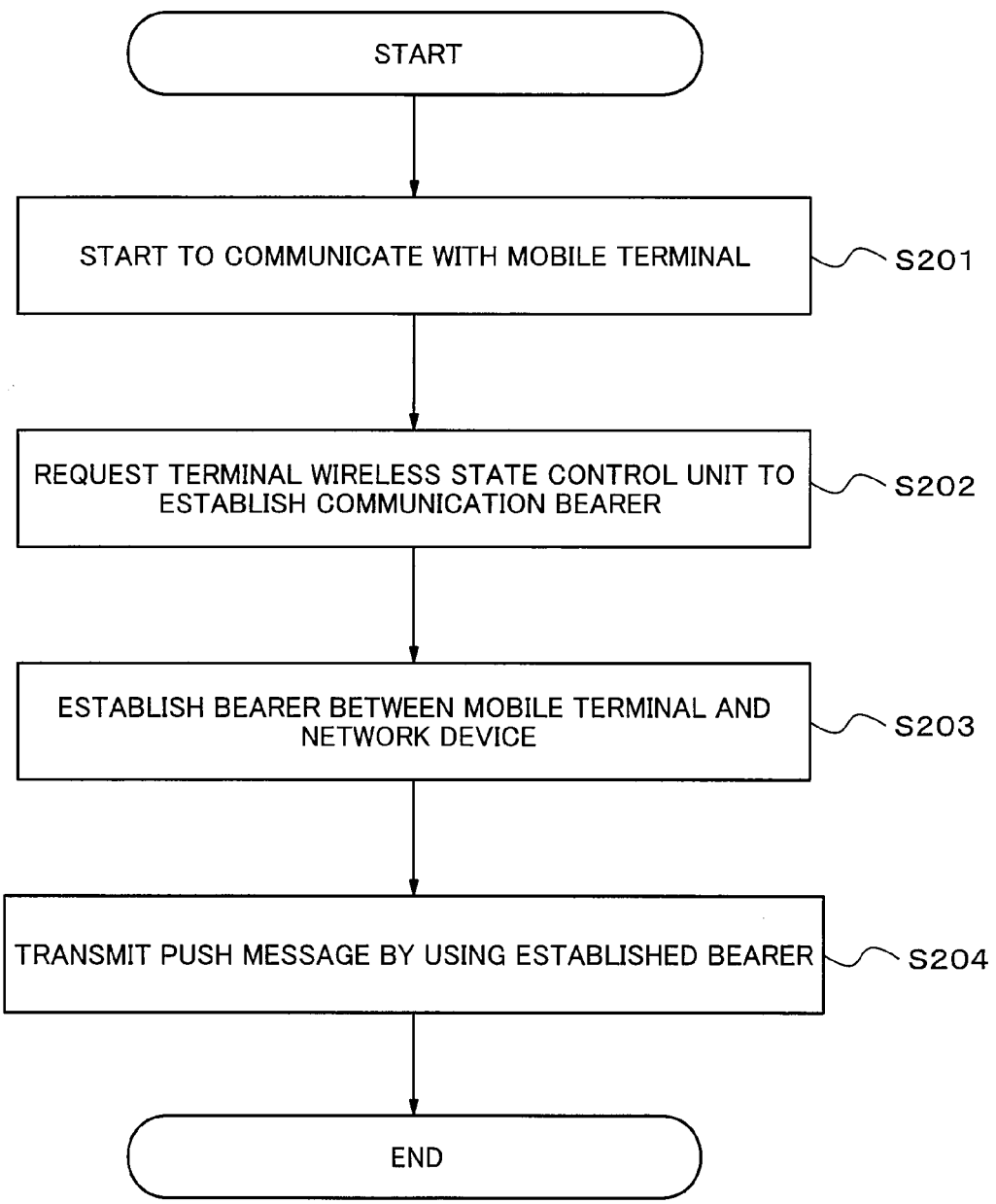
FIG. 4 is a flowchart showing a basic operation for distributing a push message to a mobile terminal in each exemplary embodiment of the present invention.

The processes of steps S101 to S108 and steps S201 to S204 explained by referring to FIG. 2 and FIG. 4 in the first exemplary embodiment are also performed in the second exemplary embodiment. However, a method for acquiring information of the RRC state of the mobile terminal 10 used in the process of step S103 is different from that of the first exemplary embodiment. The method used in the process of step S103 will be described with reference to FIG. 6.

After the process of step S102 ends, the terminal state estimation unit 35 receives an inquiry about the RRC state of the mobile terminal 10 from the distribution sequence control unit 32. When the terminal state estimation unit 35 receives the inquiry, it identifies the network device 40 managing the distribution destination mobile terminal 10 (step S103-1).

Further, the terminal state estimation unit 35 makes an inquiry about time of the last communication with the distribution destination mobile terminal 10 and a type of the network to which the mobile terminal 10 is connected to the wireless communication unit 41 of the network device 40 identified in step S103-1 (step S103-2).

The network device 40 sends information about the time of the last communication with the distribution destination mobile terminal 10 that is obtained from the communication history of the distribution destination mobile terminal 10 managed by the wireless communication unit 41 and the type of the network to which the distribution destination mobile terminal 10 is connected as a reply.

The terminal state estimation unit 35 compares the type of the network to which the distribution destination mobile terminal 10 that is the current sequence determination target is connected with information of the non communication transition preparation period corresponding to the type of the network that is given to the terminal state estimation unit 35 in advance and grasps the non communication transition preparation period of the distribution destination mobile terminal 10 that is the current sequence determination target. On the one hand, the terminal state estimation unit 35 calculates a no communication elapsed period that is a value obtained by subtracting the time at which the distribution destination mobile terminal 10 that is the current sequence determination target ends the last communication from the current time. Namely, the no communication elapsed period is the period of time elapsed after the distribution destination mobile terminal 10 that is the current sequence determination target ends the last communication.

The terminal state estimation unit 35 compares the non communication transition preparation period with the no communication elapsed period (step S103-3).

When the no communication elapsed period is shorter than the non communication transition preparation period ("Yes" in step S103-3), it is determined that the distribution destination mobile terminal 10 that is the current sequence determination target is in a communication state (step S103-4). On the other hand, when the no communication elapsed period is equal to or longer than the non communication transition preparation period ("No" in step S103-3), it is determined that the distribution destination mobile terminal 10 that is the current sequence determination target is in the temporarily stopped state (step S103-5).

All the determination results obtained by the processes of step S103-4 and step S103-5 are transmitted to the distribution sequence control unit 32 (step S103-4 and step S103-5).

These determinations will be described by using a specific example. For example, it is assumed that the non communication transition preparation period of the mobile terminal 10 connected to the network based on W-CDMA is 1 minute.

It is assumed that the type of the network to which the distribution destination mobile terminal 10 that is the current sequence determination target is connected is W-CDMA and the elapsed time after the last communication of the distribution destination mobile terminal 10 that is the current sequence determination target ends is only 30 seconds. In this case, the non communication transition preparation period is 1 minute and the no communication elapsed period is 30 seconds. Therefore, the no communication elapsed period is shorter than the non communication transition preparation period. Therefore, the terminal state estimation unit 35 determines that the mobile terminal 10 that is the current sequence determination target is in the state wherein communication is possible.

Next, a case in which the period of time elapsed after the last communication of the distribution destination mobile terminal 10 that is the current sequence determination target ends is 1 minute 30 seconds is considered. In this case, the non communication transition preparation period is 1 minute and the no communication elapsed period is 1 minute 30 seconds. Therefore, the no communication elapsed period is longer than the non communication transition preparation period. Therefore, the terminal state estimation unit 35 determines that the mobile terminal 10 that is the current sequence determination target is in the temporarily stopped state.

The second exemplary embodiment described above has an effect in which the RRC state can be estimated on the basis of the type of the network to which the mobile terminal is connected and the last communication time of the mobile terminal. Further, in this exemplary embodiment, a value obtained by subtracting the no communication elapsed period from the non communication transition preparation period may be transmitted to the distribution sequence control unit 32 as information of the allowable no communication period. By this operation, the process of step S108 can be performed in this exemplary embodiment.

Further, in step S103-3, determination is made on the basis of whether or not the no communication elapsed period is shorter than the non communication transition preparation period. Further, because the push message is not distributed immediately after the determination is made, a margin period may be included in the period and this period may be used for the determination. Namely, the determination may be made on the basis of whether or not the period obtained by adding the margin period to the no communication elapsed period is shorter than the non communication transition preparation period. This margin period is determined by taking into consideration a time lag until the push message is actually distributed to the mobile terminal 10 after the process of step S103-3 ends. For example, a predetermined period of 1 or less second is set as the margin period in advance. When this method is used, a problem in which although it is determined that the state is the "state wherein communication is possible" at the time of the process of step S103-3, the state is changed to the "temporarily stopped state" at the time of actually distributing the push message to the mobile terminal 10 due to the time lag can be prevented.

The length of the non communication transition preparation period may change when not only the different type of the network but also the different type of the distribution destination mobile terminal 10 is used. In this case, the non communication transition preparation period may be grasped by taking into consideration not only the type of the network but also the type of the distribution destination mobile terminal 10 in step S103-2.

Further, the combination of the first exemplary embodiment and the second exemplary embodiment may be used. For example, with respect to one network device 40 and the mobile terminal 10 connected to the one network device 40, information of the RRC state may be acquired by using the method described in the first exemplary embodiment and with respect to the other network device 40 and the mobile terminal 10 connected to the other network device 40, information of the RRC state may be estimated by using the method described in the second exemplary embodiment.

Further, each device included in the above-mentioned message distribution system can be realized by hardware, software, or combination of hardware and software. The message distribution method performed by each device included in the above-mentioned message distribution system can also be realized by hardware, software, or combination of hardware and software. Here, to realize the above-mentioned device or method by software means to realize a function thereof by using a computer which reads and executes a program.

The program is stored in various types of non-transitory computer readable media and can be supplied to the computer. The non-transitory computer readable medium includes various types of tangible storage media. The non-transitory computer readable medium includes for example, a magnetic recording medium (for example, a flexible disk, a magnetic tape, or a hard disk drive), a magnetooptical recording medium (for example, a magnetic optical disc), a CD-ROM (Read Only Memory), a CD-R disc, a CD-R/W disc, a semiconductor memory (for example, a mask ROM, a PROM (Programmable ROM), an EPROM (Erasable PROM), a flash ROM, and a RAM (random access memory)). The program may be supplied to the computer by various types of transitory computer readable media. An example of the transitory computer readable medium includes an electrical signal, an optical signal, and an electromagnetic wave. The transitory computer readable medium can supply the program to the computer via a wired communication path such as an electrical wire, an optical fiber, or the like or a wireless communication path.

This application is based on Japanese Patent Application No. 2013-003687 (filed on Jan. 11, 2013) and claims priority under the Paris Convention from Japanese Patent Application No. 2013-003687. The content disclosed in Japanese Patent Application No. 2013-003687 is incorporated herein by reference.

Although the typical exemplary embodiment of the present invention has been described in detail, it is to be understood that various changes, substitutions, and alternatives may be made without departing from the spirit and scope of the invention as defined in the claims. Even if the claims are amended in a filing process, the inventor intends the range of equivalency of the claims of the invention to be maintained.

The exemplary embodiment of the present invention described above has many effects as shown below.

A first effect is to prevent a delay on push distribution that occurs when the mobile terminal whose RRC state is the state wherein communication is possible transfers in the temporarily stopped state.

This is because the push distribution to the mobile terminal whose RRC state is the state wherein communication is possible is given priority over the push distribution to the mobile terminal in the temporarily stopped state.

A second effect is to reduce a load on the network device.

This is because negotiation between the network device and the mobile terminal is required to change the RRC state, this negotiation can be reduced because the change of the RRC state can be reduced in the exemplary embodiment of the present invention, and whereby, the load on the network device can be reduced.

A third effect is to reduce the power consumption of the mobile terminal.

This is because negotiation between the network device and the mobile terminal performed when the RRC state is changed is a burden on the mobile terminal and this burden increases the power consumption of the mobile terminal. The exemplary embodiment of the present invention can reduce the change of the RRC state. Therefore, the negotiation can also be reduced and whereby, the power consumption of the mobile terminal can be reduced.

A part of or all of the above-mentioned exemplary embodiment can be described as the following supplementary note. However, the present invention is not limited to the following supplementary note.

(Supplementary note 1) A distribution sequence determination device which determines a distribution sequence for a push message transmitted to each of a plurality of terminals characterized in that the distribution sequence is determined on the basis of whether each of a plurality of the terminals is in a state wherein communication is possible or in a temporarily stopped state so as to transmit the push message to each of a plurality of the terminals in the distribution sequence in which the terminal in the state wherein communication is possible is given priority over the terminal in the temporarily stopped state.

(Supplementary note 2) The distribution sequence determination device described in supplementary note 1 characterized in that the distribution sequence is determined so as to transmit the push message to each of a plurality of the terminals in the distribution sequence in which among a plurality of the terminals in the state wherein communication is possible, the terminal whose allowable no communication period required for changing the state from the state wherein communication is possible to the temporarily stopped state is short is given priority over the terminal whose allowable no communication period is long.

(Supplementary note 3) The distribution sequence determination device described in supplementary note 2 characterized in that the distribution sequence is determined so as to transmit the push message to each of a plurality of the terminals in the distribution sequence in which the highest priority is given to the terminal whose state is the state wherein communication is possible and whose allowable no communication period is not known.

(Supplementary note 4) The distribution sequence determination device described in supplementary note 2 characterized in that the distribution sequence is determined so as to transmit the push message to each of a plurality of the terminals in the distribution sequence in which with respect to the terminal whose state is the state wherein communication is possible and whose allowable no communication period is not known, a length of the allowable no communication period is set to a predetermined length and the terminal whose allowable no communication period is short is given priority over the terminal whose allowable no communication period is long.

(Supplementary note 5) The distribution sequence determination device described in any one of supplementary notes 2 to 4 characterized in that the allowable no communication period is an actual period.

(Supplementary note 6) The distribution sequence determination device described in any one of supplementary notes 2 to 4 characterized in that the allowable no communication period is an estimated period.

(Supplementary note 7) The distribution sequence determination device described in supplementary note 6 characterized in that the allowable no communication period is a period estimated on the basis of at least time at which the terminal ends the last communication.

(Supplementary note 8) The distribution sequence determination device described in any one of supplementary notes 2 to 7 characterized in that the allowable no communication period is defined as a period obtained by subtracting a period of time from a start time of the non communication transition preparation period to a current time from the non communication transition preparation period that is a no communication period required for changing the state from the state wherein communication is possible to the temporarily stopped state.

(Supplementary note 9) The distribution sequence determination device described in any one of supplementary notes 1 to 8 characterized in that it takes a predetermined time when the state of the terminal is changed from the temporarily stopped state to the state wherein communication is possible.

(Supplementary note 10) A message distribution system including a distribution sequence determination device and a network device characterized in that the distribution sequence determination device is the distribution sequence determination device described in any one of supplementary notes 1 to 9 and the network device distributes a push message to a terminal according to a distribution sequence determined by the distribution sequence determination device.

(Supplementary note 11) A distribution sequence determination method used by a device which determines a distribution sequence for a push message transmitted to each of a plurality of terminals characterized in that the distribution sequence is determined on the basis of whether each of a plurality of the terminals is in a state wherein communication is possible or in a temporarily stopped state so as to transmit the push message to each of a plurality of the terminals in the distribution sequence in which the terminal in the state wherein communication is possible is given priority over the terminal in the temporarily stopped state.

(Supplementary note 12) A distribution sequence determination program which causes a computer to function as a distribution sequence determination device which determines a distribution sequence for a push message transmitted to each of a plurality of terminals characterized in that the distribution sequence determination program causes the computer to function as the distribution sequence determination device which determines the distribution sequence on the basis of whether each of a plurality of the terminals is in a state wherein communication is possible or in a temporarily stopped state so as to transmit the push message to each of a plurality of the terminals in the distribution sequence in which the terminal in the state wherein communication is possible is given priority over the terminal in the temporarily stopped state.

(Supplementary note 13) A communication system composed of a plurality of mobile terminals which are operated by a user, a service server which cooperates with the mobile terminal and provides a service to the user, a push server which relays distribution of a push message to the mobile terminal from the service server, and a network device which transmits a message distribution request from the push server to the mobile terminal via a wireless network characterized in that the mobile terminal is composed of a terminal communication unit which communicates with the network device via the wireless network and transmits/receives data to/from the push server, a wireless state setting unit which monitors the terminal communication unit and sets an RRC state such as a high-speed communication state, a low-speed communication state, a temporarily stopped state, or the like to the terminal communication unit on the basis of a communication frequency of the mobile terminal or an instruction from the network device, a terminal application which provides a service to the user actually, and a push reception unit which distributes the push message to the terminal application specified in the push message when communication received by the terminal communication unit is the push message;

the service server is composed of a service server function unit which cooperates with the terminal application which operates on the mobile terminal and provides the service to the user;

the push server is composed of a push distribution unit which receives a request for the distribution of the push message to the mobile terminal that is requested by communication from the service server function unit, identifies the mobile terminal specified in the distribution request, and requests the distribution of the push message to the mobile terminal, a distribution sequence control unit which controls the distribution sequence for the push message according to an RRC state of the mobile terminal, a terminal state determination unit which cooperates with the network device, acquires information of the RRC state of the mobile terminal, and notifies the distribution sequence control unit of the information, and a server communication unit which transmits the push message to the mobile terminal in the sequence determined by the distribution sequence control unit to the network device; and the network device is composed of a wireless communication unit which converts data transmitted by the server device usually connected by a wired network into data for the wireless communication network and relays it to the mobile terminal, a terminal wireless state control unit which monitors wireless communication to each mobile terminal, communicates with the wireless state setting unit of the mobile terminal, and changes the RRC state of the mobile terminal when the mobile terminal does not communicate with another mobile terminal for a predetermined time or a notification indicating the change of the RRC state is received from the wireless state setting unit of the mobile terminal, and a terminal wireless state reporting unit which transmits information of the RRC state of the mobile terminal in response to a search request for the RRC state of the mobile terminal specified by the terminal state determination unit of the push server.

(Supplementary note 14) The communication system described in supplementary note 13 characterized in that the push server, receives the request for the distribution of the push message that the service server function unit transmitted to a specific mobile terminal at an arbitrary timing with the push distribution unit, identifies the mobile terminal to which the push message is distributed on the basis of information of the mobile terminal specified by the distribution request, associates the mobile terminal with the push message, and sends this information to the distribution sequence control unit, the distribution sequence control unit makes an inquiry about the RRC state of the mobile terminal to the terminal state determination unit, the terminal state determination unit determines the network device managing the mobile terminal, acquires information of the RRC state of the mobile terminal from the terminal wireless state reporting unit of the network device, and sends information of the RRC state of the mobile terminal to the distribution sequence control unit, in a case in which information of the RRC state of the mobile terminal shows only two states: a state wherein communication is possible and a temporarily stopped state, when the RRC state of the mobile terminal is the state wherein communication is possible, the distribution sequence control unit instructs the server communication unit to distribute the push message to the mobile terminal before distributing the push message to another mobile terminal in the temporarily stopped state, when the RRC state of the mobile terminal is the temporarily stopped state, the distribution sequence control unit instructs the server communication unit to distribute the push message after the distribution of the push message that is currently kept waiting for distribution, the server communication unit reads the push message in the sequence specified by the distribution sequence control unit and requests the network device to start to communicate with the mobile terminal associated with the push message, and when the communication with the mobile terminal becomes possible, the push message is transmitted to the mobile terminal.

(Supplementary note 15) The communication system described in supplementary note 13 or supplementary note 14 characterized in that the push server, receives the request for the distribution of the push message that the service server function unit transmitted to a specific mobile terminal by at an arbitrary timing with the push distribution unit, identifies the mobile terminal to which the push message is distributed on the basis of information of the mobile terminal specified by the distribution request, associates the mobile terminal with the push message, and sends this information to the distribution sequence control unit;

the distribution sequence control unit makes an inquiry about the RRC state of the mobile terminal to the terminal state determination unit;

the terminal state determination unit determines the network device managing the mobile terminal, acquires information of the RRC state of the mobile terminal from the terminal wireless state reporting unit of the network device, and sends information of the RRC state of the mobile terminal to the distribution sequence control unit;

when the distribution sequence control unit can acquire information of an allowable no communication period indicating a period of time from a current time to an end time of a no communication period at which the state is changed from a current state that is the state wherein communication is possible to the temporarily stopped state in addition to information about whether the RRC state of the mobile terminal is in the state wherein communication is possible or in the temporarily stopped state, in a case in which the RRC state of the mobile terminal is the state wherein communication is possible, the distribution sequence control unit instructs the server communication unit to distribute the push message to the mobile terminal whose RRC state is the state wherein communication is possible before distributing the push message to another mobile terminal in the temporarily stopped state and before distributing the push message which is distributed to another mobile terminal whose RRC state is the state wherein communication is possible and whose allowable no communication period is longer than that of the mobile terminal and in a case in which the RRC state of the mobile terminal is the temporarily stopped state, the distribution sequence control unit instructs the server communication unit to distribute the push message after the distribution of the push message that is currently kept waiting for distribution; and the server communication unit reads the push message in the sequence specified by the distribution sequence control unit, requests the network device to start to communicate with the mobile terminal associated with the push message, and transmits the push message to the mobile terminal when the communication with the mobile terminal becomes possible.

(Supplementary note 16) A communication system composed of a plurality of mobile terminals that are operated by a user, a service server which cooperates with the mobile terminal and provides a service to the user, a push server which relays distribution of a push message to the mobile terminal from the service server, and a network device which transmits a message distribution request from the push server to the mobile terminal via a wireless network characterized in that the mobile terminal is composed of a terminal communication unit which communicates with the network device via a mobile network and transmits/receives data to/from the push server, a wireless state setting unit which monitors the terminal communication unit and sets an RRC state such as a high-speed communication state, a low-speed communication state, a temporarily stopped state, or the like to the terminal communication unit on the basis of a communication frequency of the mobile terminal or an instruction from the network device, a terminal application which provides a service to the user actually, a push reception unit which distributes the push message to the terminal application specified in the push message when communication received by the terminal communication unit is the push message;

the service server is composed of a service server function unit which cooperates with the terminal application which operates on the mobile terminal and provides the service to the user;

the push server is composed of a push distribution unit which receives a request for the distribution of the push message to the mobile terminal that is requested by the communication from the service server function unit, identifies the mobile terminal specified in the distribution request, and distributes the push message to the mobile terminal, a distribution sequence control unit which controls the distribution sequence for the push message distributed by the push distribution unit according to an RRC state of the mobile terminal, a terminal state estimation unit which holds information of a period required for changing the state from the state wherein communication is possible to the temporarily stopped state for each type of the network to which the mobile terminal is connected in advance, cooperates with the network device, acquires a communication history of the mobile terminal, and estimates the RRC state, and a server communication unit which transmits the push message to the mobile terminal in the sequence determined by the distribution sequence control unit to the network device; and the network device is composed of a wireless communication unit which can convert data transmitted by the server device usually connected by a wired network into data for the wireless communication network, relay it to the mobile terminal, and transmit information of a time at which the relay of the communication to the specified mobile terminal occurs, and a terminal wireless state control unit which monitors wireless communication to each mobile terminal, communicates with the wireless state setting unit of the mobile terminal, and changes the RRC state of the mobile terminal when the mobile terminal does not communicate with another mobile terminal for a predetermined time or a notification indicating the change of the RRC state is received from the wireless state setting unit of the mobile terminal.

(Supplementary note 17) The communication system described in supplementary note 13 or supplementary note 14 characterized in that the push server, receives the request for the distribution of the push message that the service server function unit transmitted to a specific mobile terminal at an arbitrary timing with a push distribution unit, identifies the mobile terminal to which the push message is distributed on the basis of information of the mobile terminal specified by the distribution request, associates the mobile terminal with the push message, and sends information to the distribution sequence control unit;

the distribution sequence control unit makes an inquiry about the RRC state of the mobile terminal to a terminal state estimation unit;

the terminal state estimation unit determines the network device managing the mobile terminal and acquires time of the last communication with the mobile terminal managed by the wireless communication unit of the network device and a type of the networks to which the mobile terminal is connected, the terminal state estimation unit acquires information of a no communication transfer time that is a time required for changing the state from the state wherein communication is possible to the temporarily stopped state on the basis of the type of the network to which the mobile terminal is connected, compares it with a no communication elapsed time obtained by subtracting the time of the last communication with the terminal from a current time, determines that the state is a communication state when the no communication elapsed time is shorter than the no communication transfer time, determines that the state is the temporarily stopped state when the no communication elapsed time is equal to or grater than the no communication transfer time, and notifies the distribution sequence control unit of a result;

when the RRC state of the mobile terminal is the state wherein communication is possible, the distribution sequence control unit instructs the server communication unit to distribute the push message to the mobile terminal before distributing the push message to another mobile terminal in the temporarily stopped state, when the RRC state of the mobile terminal is the temporarily stopped state, the distribution sequence control unit instructs the server communication unit to distribute the push message after the distribution of the push message that is currently kept waiting for distribution; and the server communication unit reads the push message in the sequence specified by the distribution sequence control unit and requests the network device to start to communicate with the mobile terminal associated with the push message, and transmits the push message to the mobile terminal when the communication with the mobile terminal becomes possible.

(Supplementary note 18) The communication system described in supplementary note 13 or supplementary note 14 characterized in that the push server, receives the request for the distribution of the push message that the service server function unit transmitted to a specific mobile terminal at an arbitrary timing by a push distribution unit, identifies the mobile terminal to which the push message is distributed on the basis of information of the mobile terminal specified by the distribution request, associates the mobile terminal with the push message, and sends this information to the distribution sequence control unit;

the distribution sequence control unit makes an inquiry about the RRC state of the mobile terminal to the terminal state estimation unit;

the terminal state estimation unit determines the network device managing the mobile terminal and acquires the time of the last communication with the mobile terminal managed by the wireless communication unit of the network device and the type of the networks to which the mobile terminal is connected, acquires information of a no communication transfer time that is a time required for changing the state from the state wherein communication is possible to the temporarily stopped state on the basis of the type of the network to which the mobile terminal is connected, compares it with a no communication elapsed time obtained by subtracting the time of the last communication with the terminal from the current time, determines that the state is a communication state when the no communication elapsed time is shorter than the no communication transfer time and notifies the distribution sequence control unit of a value obtained by subtracting the no communication elapsed time from the no communication transfer time as the allowable no communication time, determines that the state is the temporarily stopped state when the no communication elapsed time is equal to or longer than the no communication transfer time, and notifies the distribution sequence control unit of a result;

when the distribution sequence control unit can acquire information of an allowable no communication period indicating a period of time from a current time to an end time of a no communication period at which the state is changed from a current state that is the state wherein communication is possible to the temporarily stopped state in addition to information about whether the RRC state of the mobile terminal is in the state wherein communication is possible or in the temporarily stopped state, in a case in which the RRC state of the mobile terminal is the state wherein communication is possible, the distribution sequence control unit instructs the server communication unit to distribute the push message to the mobile terminal whose RRC state is the state wherein communication is possible before distributing the push message to another mobile terminal in the temporarily stopped state and before distributing the push message which is distributed to another mobile terminal whose RRC state is the state wherein communication is possible and whose allowable no communication period is longer than that of the mobile terminal and in a case in which the RRC state of the mobile terminal is the temporarily stopped state, the distribution sequence control unit instructs the server communication unit to distribute the push message after the distribution of the push message that is currently kept waiting for distribution; and the server communication unit reads the push message in the sequence specified by the distribution sequence control unit, requests the network device to start to communicate with the mobile terminal associated with the push message and transmits the push message to the mobile terminal when the communication with the mobile terminal becomes possible.

INDUSTRIAL APPLICABILITY

The present invention can be applied to an application in which the distribution of a push message to a mobile terminal is controlled from a server provided on a network.

What is claimed is:

1. A distribution sequence determination device, comprising:
    a terminal state determination unit that acquires information as to whether each of a plurality of terminals to which a message is transmitted is in a state in which communication is possible or in a temporarily stopped state, based on a communication frequency of the terminal, wherein when no data packet is received from the terminal during a fixed period of time, the terminal is changed from being in the state in which communication is possible to the temporarily stopped state, and wherein when the terminal is able to receive data packets, the terminal is changed from the temporarily stopped state to the state in which communication is possible; and
    a distribution sequence control unit that determines a distribution sequence for the message on the basis of the information so as to transmit the message to each of a plurality of the terminals in a sequence in which the terminal in the state in which communication is possible is given priority over the terminal in the temporarily stopped state, wherein the distribution sequence determination device transmits the message to each terminal in accordance with the determined sequence, the determined distributed sequence reducing a time in which the terminals receive the message by taking into account a length of time in which the terminal in the temporarily stopped state exits the temporarily stopped state.

2. The distribution sequence determination device according to claim 1, wherein:
the distribution sequence control unit determines the distribution sequence so as to transmit the message to each of the plurality of the terminals in the sequence in which among the terminals in which communication is possible, such that a first terminal having an allowable no-communication period required to transition the first terminal to temporarily stop communication that is less than a threshold is given priority within the sequence over a second terminal having an allowable no-communication period required to transition the second terminal to temporarily stop communication that is greater than the threshold.

3. The distribution sequence determination device according to claim 2, wherein
the distribution sequence control unit determines the distribution sequence so that a third terminal in which communication is possible and having an allowable no-communication period required to transition the third terminal to temporarily stop communication that is unknown is given highest priority within the sequence.

4. The distribution sequence determination device according to claim 3, wherein
the distribution sequence control unit sets the allowable no-communication period of the third terminal to a predetermined length.

5. The distribution sequence determination device according to claim 2, wherein
the allowable no-communication period is an estimated period.

6. The distribution sequence determination device according to claim 5, wherein
the allowable no-communication period is a period estimated on the basis of at least time at which the terminal ends the last communication.

7. A message distribution system comprising:
a distribution sequence determination device; and
a network device,
wherein the distribution sequence determine device comprises:
a terminal state determination unit that acquires information as to whether each of a plurality of terminals to which a message is transmitted is in a state in which communication is possible or in a temporarily stopped state, based on a communication frequency of the terminal, wherein when no data packet is received from the terminal during a fixed period of time, the terminal is changed from being in the state in which communication is possible to the temporarily stopped state, and wherein when the terminal is able to receive data packets, the terminal is changed from the temporarily stopped state to the state in which communication is possible; and
a distribution sequence control unit that determines a distribution sequence for the message on the basis of the information so as to transmit the message to each of a plurality of the terminals in a sequence in which the terminal in the state in which communication is possible is given priority over the terminal in the temporarily stopped state,
wherein the distribution sequence determination device transmits the message to each terminal in accordance with the determined sequence, the determined distributed sequence reducing a time in which the terminals receive the message by taking into account a length of time in which the terminal in the temporarily stopped state exits the temporarily stopped state,
and wherein the network device distributes a message to a terminal according to a distribution sequence determined by the distribution sequence determination device.

8. A distribution sequence determination method, comprising:
acquiring information as to whether each of a plurality of terminals to which a message is transmitted is in a state in which communication is possible or in a temporarily stopped state, based on a communication frequency of the terminal, wherein when no data packet is received from the terminal during a fixed period of time, the terminal is changed from being in the state in which communication is possible to the temporarily stopped state, and wherein when the terminal is able to receive data packets, the terminal is changed from the temporarily stopped state to the state in which communication is possible;
determining distribution sequence on the basis of the information so as to transmit the push message to each of a plurality of the terminals in a sequence in which the terminal in the state wherein communication is possible is given priority over the terminal in the temporarily stopped state; and
transmitting the message to each terminal in accordance with the determined sequence, the determined distributed sequence reducing a time in which the terminals receive the message by taking into account a length of time in which the terminal in the temporarily stopped state exits the temporarily stopped state.

9. A non-transitory computer readable medium storing a distribution sequence determination program which causes a computer to function as
terminal state determination unit that acquires information as to whether each of a plurality of terminals to which a message is transmitted is in a state in which communication is possible or in a temporarily stopped state, based on a communication frequency of the terminal, wherein when no data packet is received from the terminal during a fixed period of time, the terminal is changed from being in the state in which communication is possible to the temporarily stopped state, and wherein when the terminal is able to receive data packets, the terminal is changed from the temporarily stopped state to the state in which communication is possible; and
distribution sequence control unit that determines a distribution sequence on the basis of the information so as to transmit the message to each of a plurality of the terminals in a sequence in which the terminal in the state wherein communication is possible is given priority over the terminal in the temporarily stopped state,
wherein the computer transmits the message to each terminal in accordance with the determined sequence, the determined distributed sequence reducing a time in which the terminals receive the message by taking into account a length of time in which the terminal in the temporarily stopped state exits the temporarily stopped state.

* * * * *